United States Patent

[11] 3,576,216

| [72] | Inventor | Willard H. Tanke |
| | | La Crosse, Wis. |
| [21] | Appl. No. | 809,176 |
| [22] | Filed | Mar. 21, 1969 |
| [45] | Patented | Apr. 27, 1971 |
| [73] | Assignee | Allis-Chalmers Manufacturing Company |
| | | Milwaukee, Wis. |

[54] SPRING MOUNTING FOR DISC HARROW BLADES
5 Claims, 1 Drawing Fig.

[52] U.S. Cl. ............................................. 172/570,
172/601, 172/604, 172/711
[51] Int. Cl. ............................................. A01b 21/08,
A01b 23/06
[50] Field of Search ............................................. 172/108,
117, 548, 570, 711, 527, 599, 604, 601

[56] References Cited
UNITED STATES PATENTS
| 1,183,828 | 5/1916 | Bjorkman ..................... | 172/548 |
| 2,197,424 | 4/1940 | Benjamin ..................... | 172/604X |
| 2,773,343 | 12/1956 | Oppel ............................. | 172/570X |

FOREIGN PATENTS
| 261,823 | 11/1926 | Great Britain ................ | 172/599 |
| 776,767 | 6/1957 | Great Britain ................ | 172/548 |
| 1,284,428 | 1/1962 | France .......................... | 172/527 |
| 806,176 | 6/1951 | Germany ....................... | 172/548 |

Primary Examiner—Robert E. Pulfrey
Assistant Examiner—Clifford D. Crowder
Attorneys—Kenneth C. McKivett, Robert B. Benson and Charles L. Schwab ABSTRACT: Apparatus for minimizing damage to discs in a disc harrow implement by providing supports for the discs in the nature of multileaf springs so that upon contacting an obstruction the outer portion of the disc will flex adjacent the edge of the outer spring leaf and if the load to which the disc is being subjected is even greater then the disc will also flex about the edge of the next spring leaf closer to the center of the disc and the load is heavy enough the disc will also flex about the outer periphery of the spacers at which point the disc is mounted substantially rigid, and some deflection may take place in the standard supporting the discs and their gang bolt.

PATENTED APR 27 1971 3,576,216
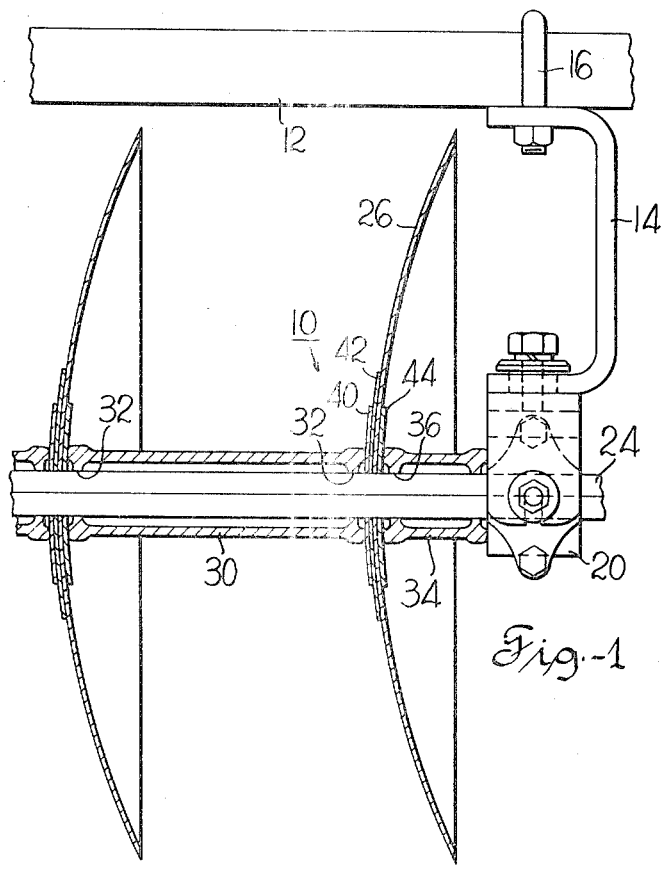
Fig.-1
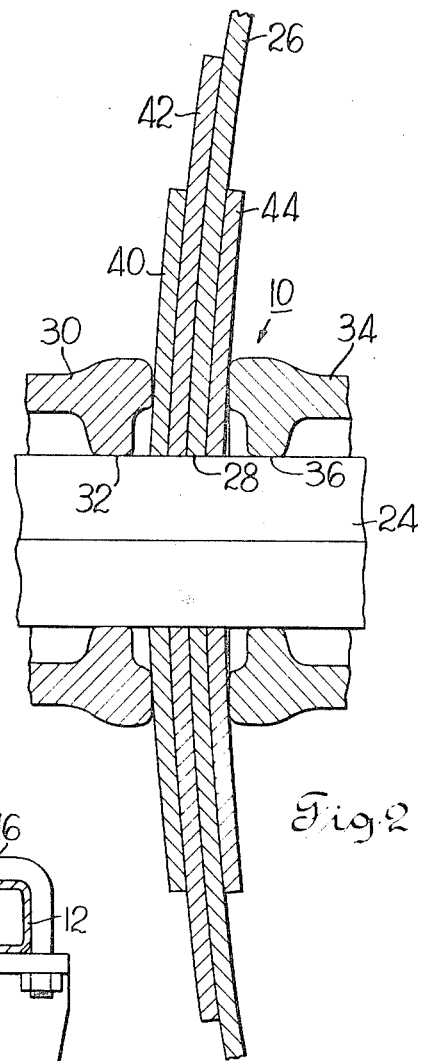
Fig.2
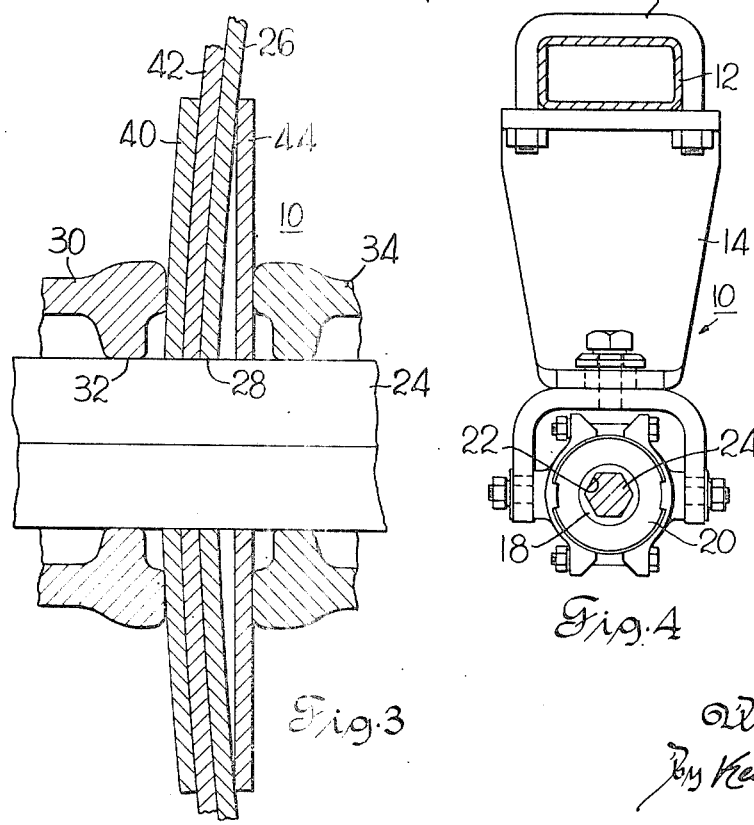
Fig.3
Fig.4
Inventor
Willard H. Tanke
By Kenneth C...
Attorney

SPRING MOUNTING FOR DISC HARROW BLADES

The present invention relates generally to ground working disc implements and has for its general object the provision of novel means for supporting the discs whereby the breakage of discs and the supports therefor due to striking of stones and rocks when the discs are drawn through soil are substantially reduced or eliminated.

With the increase in tractor power resulting in disc implements being operated at higher speeds, plus larger, heavier disc harrows and larger diameter disc blades (18 inches —20 inches) far greater loads are imposed on the disc blades than ever before.

This condition has forced an increase in the material thickness of the blade. In the past 10 to 15 years, the disc thickness grew from a 12 (0.109 inch) guage for a 16 inch diameter blade, to a 10 (0.134 inch) gauge for the standard 18 inch and 20 inch blades used today; plus having an 8 (0.165 inch) gauge blade as an option for heavy duty applications. An increase in the number of blades used on each harrow has also taken place resulting in a considerable increase in the cost of harrows.

This above-referred to increase in blade thickness to minimize blade failures has not kept pace with growth in harrow size and weight, and tractor power. Reasons for failure to minimize blade failure can be categorically listed:

1. Supporting means for the discs such as spools, shafts and bearing hangers are heavier imposing even greater loads on the discs.
2. Far greater loads are imposed on the blade cutting edge because of the rigid supporting means and the increase in blade section. However, the cutting edge practically remains unchanged, because a sharp and tapered edge is required for soil penetration and cutting ability and accordingly, the cutting edge resistance to chip and tear has been reduced.
3. Another common failure, usually occurring on the front gang outside disc blades, is a circular break around the periphery of the spool making contact on the backside of the blade. This break indicates a high load stress concentration at this point.

As very little attention has been given through the years on minimizing blade failures through the supporting means it is evident that if a support means was designed that was sufficiently rigid to adequately hold the disc to its proper working position in soil loads, yet have the ability to flex and absorb shock loads when striking obstructions in the soil, disc blade failures would be minimized.

Resilient means have been tried in the prior art but these have not been entirely satisfactory in that they tended to permit the blade to tilt away from its work.

Accordingly, it is the primary object of this invention to provide a support for a disc in the nature of a multileaf spring so that upon contacting an obstruction the outer portion of the disc will flex adjacent the edge of the outer spring leaf and if the load to which the disc is being subject is even greater then the disc will also flex about the edge of the next spring leaf closer to the center of the disc and if the load is heavy enough the disc will also flex about the outer periphery of the spacers at which point the blade is mounted substantially rigid; however, if the load is sufficiently heavy, a flexing will also take place in the hanger supporting the discs from the frame.

Referring to the drawings:

FIG. 1 is a fragmentary sectional elevation of a disc gang of an implement embodying the invention;

FIG. 2 is an enlarged fragment of FIG. 1;

FIG. 3 is a view similar to FIG. 2 showing a modification; and

FIG. 4 is an end view of the embodiment shown in FIG. 1.

Referring now to the drawings, and more particularly to FIGS. 1 and 2, the disc gang indicated in its entirety by the reference numeral 10 includes a frame 12 to which are fixed supporting standards 14 (only one of which is shown) by means of U-bolt 16. The lower ends of the standards carry bearings 18 (FIG. 4) which are journaled in cylindrical bearing sleeves 20, the former having apertures 22 of hexagon cross section to receive a hexagon gang bolt 24. Disposed on the bolt 24 are concave-convex ground working discs 26, each of which is provided with a hexagon opening 28 adapted to receive the bolt 24. The opening 28 is only large enough to permit axial sliding movement of the disc on the bolt. Between each pair of adjacent discs is disposed a spacing spool 30 having an interior passage 32 of hexagon cross section adapted to slide over the bolt 24 to prevent rotation of the spool relative to the bolt 24. Adjacent the right-hand end of frame 12 bearing spool 34 (FIG. 1) is provided having an interior hexagon passageway 36 of a size to receive bolt 24.

A spring steel disc 40 is positioned between end face of spool 30 and a second larger spring steel disc 42 which is mounted to contact one side of disc 26. A spring steel disc 44 is positioned between the end of spacer spool 34 and the other side of disc 26. Disc 44 is identical to disc 40, however, if desired, disc 40 may be dished to conform to the curvature of disc 26 and disc 44 may be flat as indicated in FIG. 3 but will resiliently conform to the shape of blade 26 when bolt 24 has been tightened. Blade 44 in FIG. 3 thus functions like a Belleville washer.

It should now be apparent that when bolt 24 is tightened in a conventional manner, spacer spools 30 and 34 will be drawn up against spring steel discs 40 and 44 which in turn clamp discs 42 and 26 therebetween.

Then if the disc 26 strikes a rock or stone when it is being drawn through a soil bed, disc 26 will deflect about the outer periphery of disc 42 and if the contact between rock and blade 26 is severe enough then the blade 26 will additionally deflect about the peripheral edge of blade 40 and if severe enough, about the outer edge of spacer spool 30, much in the manner of a leaf spring. And if the contact between rock and blade 26 is severe enough, standard members 14 will also flex to minimize damage to blade 26.

It is seen that standard 14 (FIG. 4) is tapered and is provided with a relatively large base portion for attachment to frame 12 and its opposite end is much smaller so that standard 14 is in the nature of a cantilever beam of uniform strength.

From the foregoing, it should now be apparent that means has been provided for minimizing damage to discs by providing a resilient mounting but which still maintains the disc in working attitude. That is, the mounting is such that the disc can bend but it will not tilt relative to the gang bolt to get out of good working position.

The embodiments of the invention in which an exclusive property or privilege is claimed are defined as follows:

I claim:

1. In a ground working tool, a gang bolt, a ground working disc having an aperture through which said bolt extends, a plurality of spring steel discs mounted on said bolt with at least one of said spring steel discs being mounted on each side of said ground working disc in contacting relation thereto, a pair of spacer spools mounted on said bolt outboard from said spring steel discs for comparing said spring steel discs and said ground working disc in rigid relation to said bolt, said spring steel discs having a greater diameter than said spools and a lesser diameter than said ground working disc, the spring steel discs positioned adjacent to said working disc being formed to contact said working disc from said bolt to the peripheral surface of said spring steel discs to provide a leaf spring support for said working disc, one of said discs contacting said ground working disc having a diameter greater than the other of said contacting discs, an additional spring steel disc mounted between one of said contacting discs and one of said spools, said additional disc being of a diameter less than the adjacent contacting disc and being of a conformation complementary to said adjacent disc so as to contact same from said bolt to the periphery of said additional disc to provide an additional spring in the leaf spring mounting of said ground working disc.

2. In a ground working tool as recited in claim 1 and wherein said discs are concave-convex and said additional disc is mounted adjacent to the convex side of said one of said discs and being spaced from said ground working disc by said one of said discs.

3. In a ground working tool as recited in claim 2 wherein the spring steel disc positioned adjacent the concave side of said ground working disc is a flat disc and is deformed to assume a shape complementary to the concave side of said ground working disc by a tightening action of said bolt for moving said spools towards each other.

4. In a ground working tool as recited in claim 3 and wherein said additional disc has a diameter less than the diameter of the spring steel disc mounted adjacent thereto.

5. In a ground working tool as recited in claim 4 and wherein the diameter of said additional steel disc is equal to the diameter of the spring steel disc mounted adjacent to the concave side of said ground wording disc.

PO-1050
(5/69)

UNITED STATES PATENT OFFICE
CERTIFICATE OF CORRECTION

Patent No. 3,576,216      Dated April 27, 1971

Inventor(s) Willard H. Tanke

It is certified that error appears in the above-identified patent and that said Letters Patent are hereby corrected as shown below:

In the Abstract, line 8, after "and" and before "the" --- if --- should be inserted;  Column 2, line 56, "compa should read --- clamping --- ;  Column 3, line 4, after " --- and --- should be inserted;  Column 4, line 7, "wording should read --- working --- .

Signed and sealed this 4th day of January 1972.

(SEAL)
Attest:

EDWARD M. FLETCHER, JR.         ROBERT GOTTSCHALK
Attesting Officer                Acting Commissioner of Pat